Nov. 15, 1927.

W. A. HUNT 1,649,348

LUBRICATING DEVICE

Filed March 1, 1926   2 Sheets-Sheet 1

Inventor
William A. Hunt
per
Attorneys

Nov. 15, 1927. 1,649,348
W. A. HUNT
LUBRICATING DEVICE
Filed March 1, 1926  2 Sheets-Sheet 2
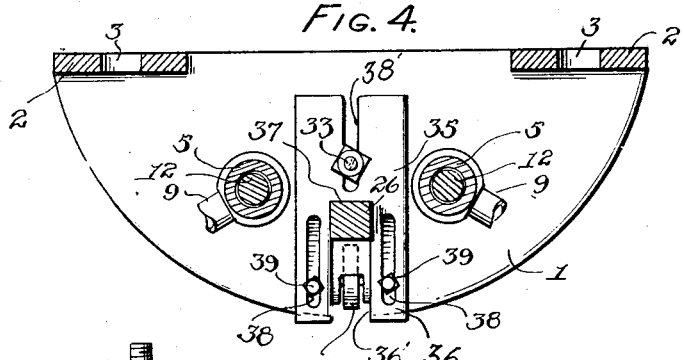
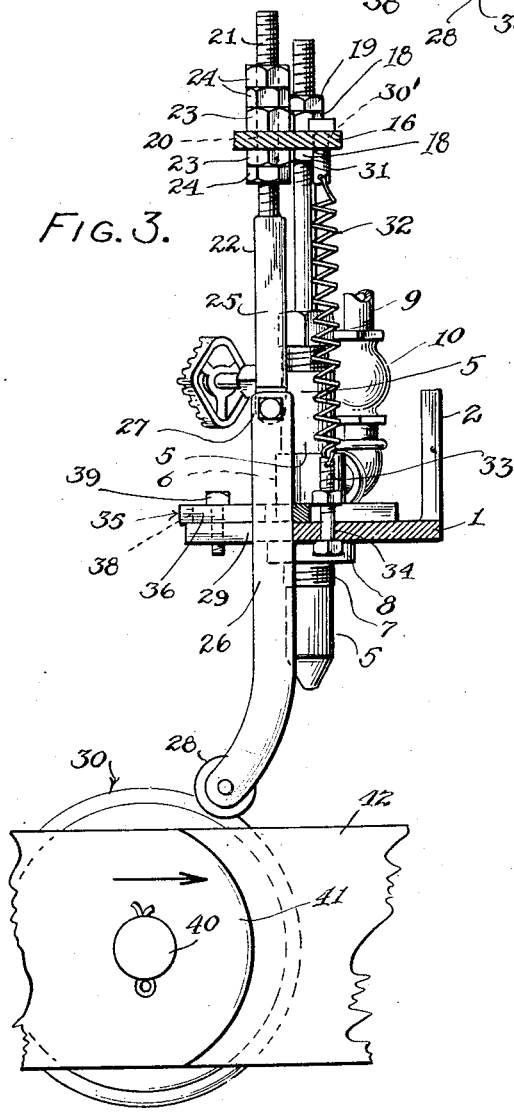
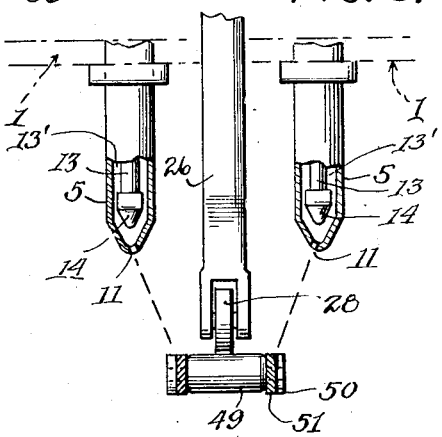
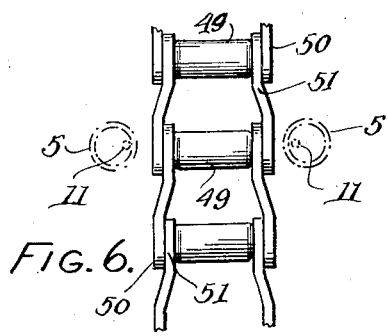
INVENTOR
William A. Hunt
BY
ATTORNEYS Patented Nov. 15, 1927.

1,649,348

UNITED STATES PATENT OFFICE.

WILLIAM A. HUNT, OF HOLDEN, WEST VIRGINIA.

LUBRICATING DEVICE.

Application filed March 1, 1926. Serial No. 91,608.

My invention relates to improvements in lubricating devices for conveyors and sprocket chains and has for its object to provide a device of this kind which will be automatic in its operation when it has been placed in operative position, which will direct a stream of oil accurately on the parts to be lubricated, and which will have means actuated by the rollers of the conveyor or chain itself for timing the flow of oil, the timing means being so constructed that it can be moved out of the position in which it is engaged by the rollers when the chain has been sufficiently oiled.

The invention is illustrated by way of example in the accompanying drawings in which Fig. 1 shows a front elevation of the device;

Fig. 3 is a vertical section on the line III—III of Fig. 1;

Fig. 4 is a horizontal section on the line IV—IV of Fig. 1;

Fig. 5 is a partial view of a modification, with parts broken away; and

Fig. 6 is a plan view of a chain with which the device of Fig. 5 is adapted to be used, showing in dotted lines the relative positions of the cylinders.

Figures 1, 2:
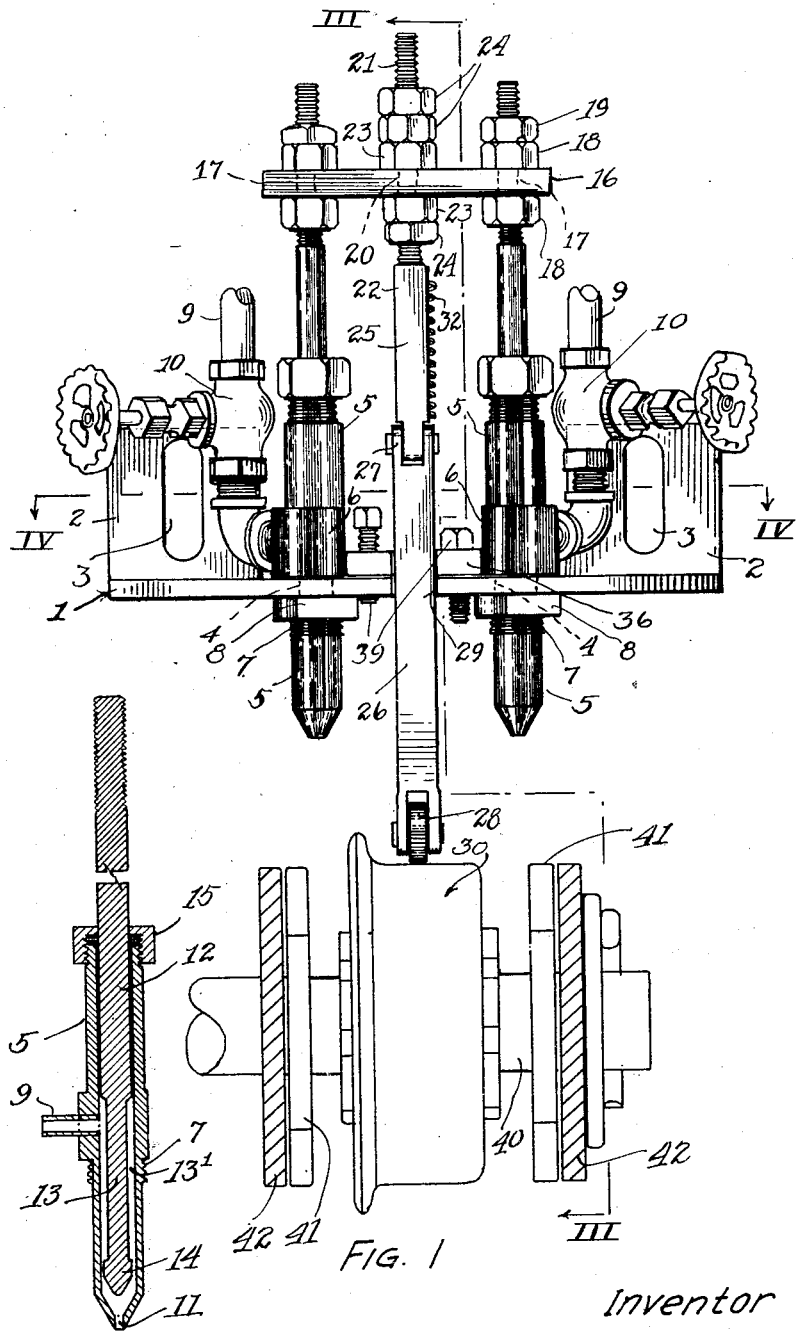
Fig. 2 is a longitudinal section of one of the cylinders.

Referring to the drawings it will be seen that reference numeral 1 indicates a base plate provided with upright flanges 2 having slots 3 for the reception of bolts (not shown) for bolting the device to a support positioned over the conveyor to be lubricated. Base plate 1 is provided with holes 4 in which are inserted cylinders 5. The shoulders 6 of cylinders 5 rest on the upper face of the base plate, and the cylinders are threaded as at 7 for the reception of nuts 8 by which the cylinders are clamped to the base plate.

Each cylinder 5 has let into it through its shoulder 6 a pipe 9, the other ends of the pipes 9 being in communication with an oil reservoir (not shown). Each pipe 9 is provided with a shut-off valve 10. The cylinders 5 have openings 11 in their lower ends through which the oil is squirted at the proper instant by plungers 12. The plungers 12 are reduced at 13 to provide spaces 13′ for the reception of oil from pipes 9. The extreme lower ends of the plungers are enlarged as at 14 to provide means for forcing the oil out and for securely closing the openings 11 after each stroke of the plungers. The upper ends of the cylinders are provided with stuffing boxes 15.

The plungers 12 are rigidly connected to each other by a cross-head 16 provided with holes 17 for the reception of the upper ends of the plungers which are threaded and clamped to the cross-head by nuts 18 and lock-nuts 19.

A third hole 20 in the cross-head is adapted to receive the upper end 25 of the timer arm 22, which is threaded at 21 for the reception of nuts 23 and lock-nuts 24 to hold the timer arm against vertical movement with respect to the cross-head. The timer arm is however left free to rotate in the hole 20 for a purpose to be described. The lower section 26 of the timer arm is hinged to the upper section at 27 and when in operative position extends down through a slot 29 in the base plate 1. The extreme lower end of the timer arm is curved forwardly and forked. A roller 28 is revolubly mounted in the forked lower end of the timer arm, and is adapted to engage the rollers 30 of the conveyor as they move under the lubricator.

A spring 32 is connected at one end to a headed pin 31 passed through a hole 30′ in the cross-head, and at its other end to a bolt 33 extending through a hole 34 in the base plate 1.

The operation of the device is as follows: The parts being in the position shown in Fig. 3 the roller 30, moving in the direction indicated by the arrow will strike roller 28, and since the lower section 26 of the timer arm is held against backward movement on its pivot 27 by the rear end of slot 29, the timer arm will move upwardly, drawing with it pistons 12, which will permit oil to flow into the cylinders from pipe 9. When roller 28 reaches the highest point of roller 30 the lower section 26 of the timer arm will kick forwardly on its hinge 27 and permit spring 32 to snap the pistons down, thereby forcing two streams of oil out through openings 11 of the cylinders. The streams of oil remain in compact masses until they strike the axle 40 of the roller, when they splash and lubricate the joints 41, 42 of the conveyor as well as the axle 40.

The device can be timed to project the streams of oil at just the proper time so that they will land squarely on the axle 40 by means of the adjusting block 35. The block 35 has two arms 36 forming between them a slot 36' which is situated directly over the slot 29 of the base plate 1. The timer arm is guided in its reciprocation by the rear end 37 of slot 36'. Block 35 is provided with a slot 38 in each arm 36, through which slots pass cap-screws 39 tapped into the base plate 1, whereby the block 35 may be adjusted forwardly and rearwardly to vary the distance between the timer arm and the cylinders along the line of travel of the conveyor. A third slot 38' is provided in block 35 for the bolt 33, and this bolt may be provided with a nut for clamping down the rear end of block 35.

Vertical adjustment of the whole device on its support is permitted by slots 3, so that the vertical position of the roller 28 with respect to the rollers 30 can be regulated. This adjustment permits regulation to some extent of the amount of oil forced out at each stroke, as well as the securing of a proper action of the timer arm.

When the conveyor has been sufficiently oiled the lower end 26 of the timer arm is pulled forwardly out of the slot 29 and turned to one side so that it rests upon the upper face of the base plate 1, the previously mentioned loose mounting of the timer arm in the hole 20 permitting this rotation of the timer arm.

In Fig. 5 is shown a partial view of a modified form of the device adapted to oil sprocket chains which are narrower than the rollers of conveyors. This form of the invention is the same as the other in all respects except that the openings 11 are located at one side of the lower ends of the cylinders, so that when the timer arm kicks off the rollers 49 of the chain the streams of oil will be projected inwardly to strike the joints 50, 51 of the chain.

Having described my invention,
I claim:

1. A lubricating device for moving chains having a series of transverse elements comprising a cylinder having an opening directed toward the chain, means for supplying oil to said cylinder, a plunger in said cylinder adapted to close said opening, a timer arm connected to said plunger and adapted to move into and out the path of the transverse elements of the chain, and yieldable means normally holding said timer arm in the path of said transverse elements.

2. A lubricating device for moving chains having a series of transverse elements comprising a cylinder having an opening directed toward the chain, means for supplying oil to said cylinder, a plunger in said cylinder adapted to close said opening, a timer arm consisting of two sections pivoted together, the axis of the pivot being transverse to the movement of the chain, means for fixing one of the sections to said plunger, the outer end of the second section normally projecting in the path of the transverse elements, means for yieldingly holding the timer arm in normal position, and means for holding said second section of the timer arm against movement on its pivot in the direction of the motion of the chain, whereby the timer arm will be moved longitudinally of itself by the transverse members of the chain, drawing with it the plunger, thereby permitting oil to flow into the cylinder, and the second section of the timer arm will kick out when it reaches the high points of the transverse members, permitting the plunger to snap back to normal position and project the oil in the cylinder through the opening.

3. A lubricating device for moving chains having a series of rollers mounted on transverse pins comprising a pair of cylinders mounted one on each side of the path of the rollers, a plunger in each cylinder, a common timer arm fixed at one of its ends to said plungers, the other end thereof normally projecting into the path of said rollers, yieldable means urging said timer arm toward normal position, means for supplying oil to said cylinders, and an opening in each of said cylinders directed toward the path of the parts of said transverse pins on its respective side of the rollers.

4. A lubricating device for relatively narrow moving chains having longitudinal links and transverse elements comprising a pair of cylinders mounted one on each side of the chain and extending substantially perpendicularly to the plane of the chain, an opening in the end of each cylinder directed inwardly toward the longitudinal links of the chain nearest it, means for supplying oil to said cylinders, and means operable by the transverse elements of the chain for intermittently projecting oil through said openings.

5. A lubricating device for moving chains having a series of transverse elements comprising a cylinder having an opening in one end directed toward the chain, a plunger in said cylinder having a reduced portion, means for introducing oil into said cylinder at a point opposite the reduced portion of the plunger, the end of said plunger being adapted to close said opening when in one extreme position, and means operable by the transverse elements of the chain for reciprocating the plunger to intermittently project oil onto the chain.

6. A lubricating device for moving chains having a series of transverse elements comprising, a cylinder having an opening directed toward the chain, means for supplying oil to said cylinder, a plunger in said cylinder, an arm pivoted to swing in the direction of movement of the chain, means supporting said pivot for reciprocating movement substantially perpendicular to the chain, the free end of said arm being thereby moved into and out of the path of said transverse elements, connections between said supporting means and said plunger whereby said plunger is reciprocated by movement of said supporting means, yieldable means normally urging said supporting means into a position such that the free end of said arm lies in the path of said transverse elements, and a stop limiting pivotal movement of said arm toward the direction in which said chain is moving.

The foregoing specification signed at Holden, W. Va., this 22 day of Feb., 1926.

WILLIAM A. HUNT.